United States Patent [19]
Vasilatos

[11] 3,751,998
[45] Aug. 14, 1973

[54] LINEAR ACTUATOR

[76] Inventor: Anastasios J. Vasilatos, 244 Hibbard Rd., Wilmette, Ill. 60091

[22] Filed: May 18, 1971

[21] Appl. No.: 144,490

[52] U.S. Cl. .......................................... 74/89.15
[51] Int. Cl. ........................................... F16h 27/02
[58] Field of Search .................. 74/89.15, 424.8 B

[56] References Cited
UNITED STATES PATENTS
| | | | |
|---|---|---|---|
| 3,398,484 | 8/1968 | Katsumura et al. ............... | 74/89.15 |
| 3,585,868 | 6/1971 | Scott ................................. | 74/89.15 |
| 3,269,199 | 8/1966 | Deehan et al. .................... | 74/89.15 |
| 3,407,680 | 10/1968 | Westmoreland ................. | 74/424.8 B |
| 3,530,734 | 9/1970 | Wray .............................. | 74/424.8 B |

Primary Examiner—Charles J. Myhre
Assistant Examiner—Wesley S. Ratliff, Jr.
Attorney—Jacque L. Meister

[57] ABSTRACT

A motor driven linear actuator arranged with the motor interior of the actuator plunger. The motor has affixed to its output shaft a worm gear which is engaged with corresponding teeth of an internal worm cut into the interior face of the plunger. The plunger is guided and supported during its selective reciprocation either by the motor housing or the motor housing in combination with an additional tubular housing covering the actuator.

15 Claims, 11 Drawing Figures

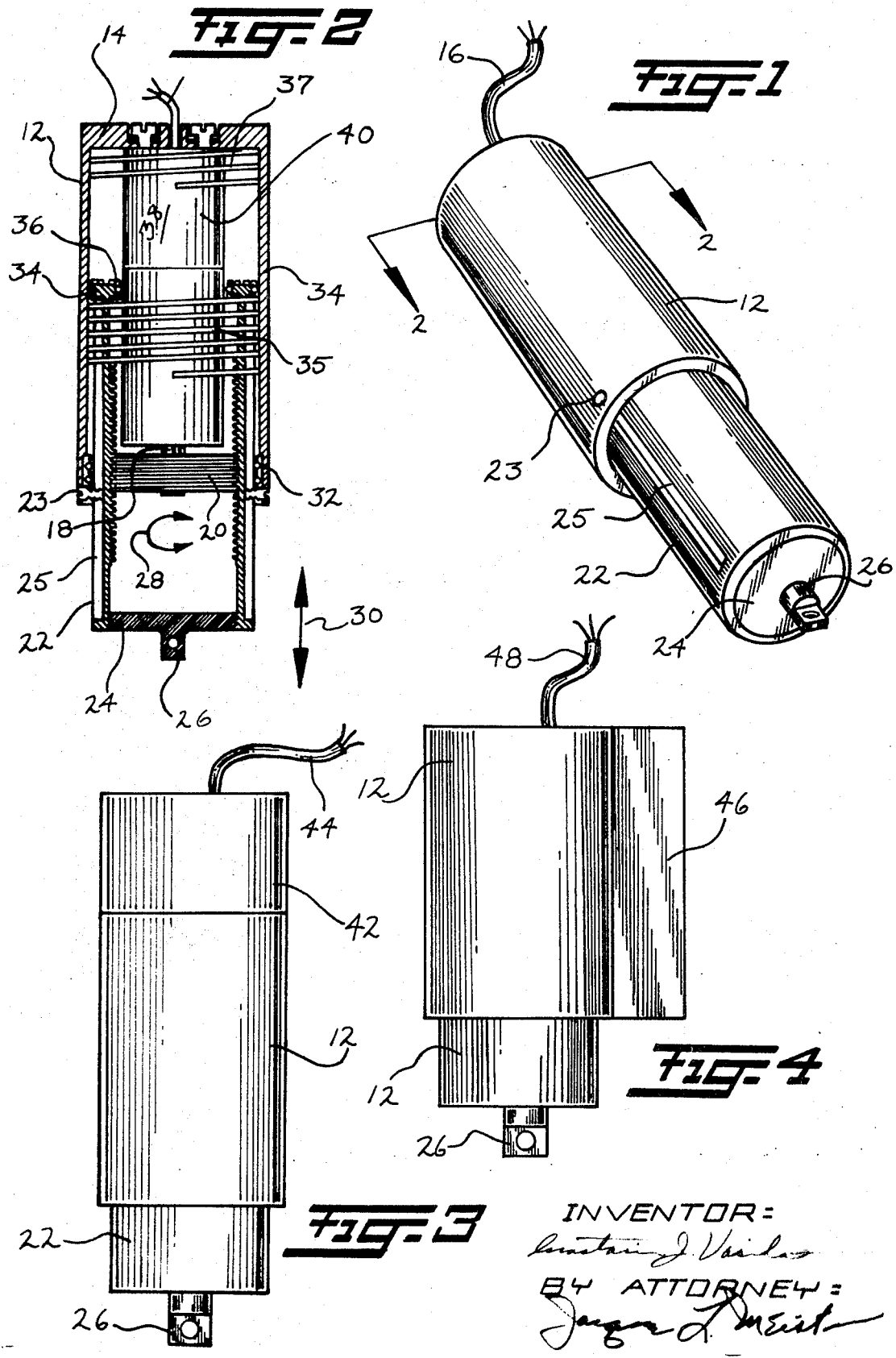

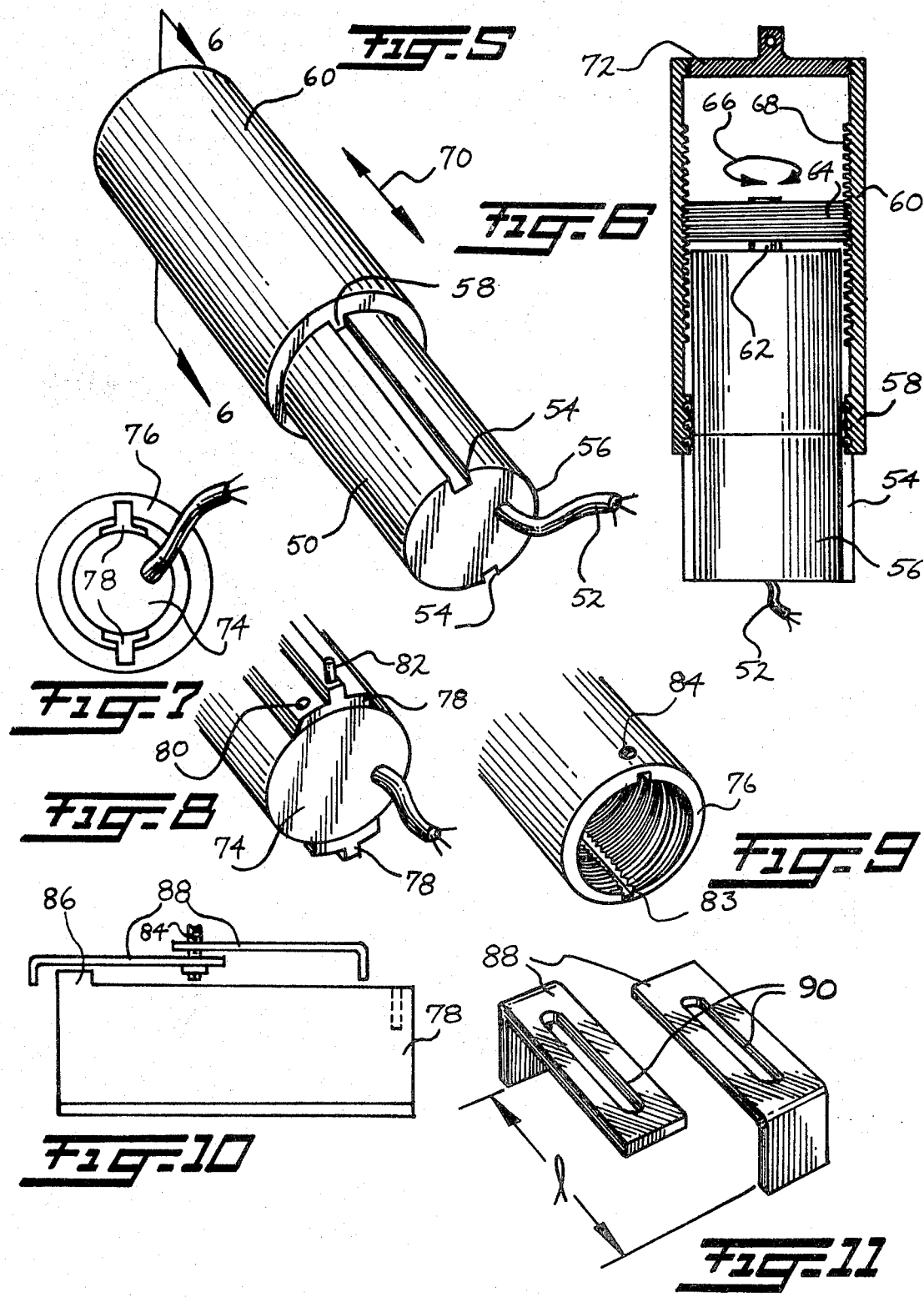

LINEAR ACTUATOR

BACKROUND OF THE INVENTION

The present invention relates to powered linear actuators and more particularly to an improved actuator having a worm gear and worm drive.

Linear actuators and particularly screw and traveling nut type linear actuators are well-known mechanical devices having myriad variations. Most of these devices have a rotating power source arranged for non-rotation with respect to the actuator plunger and the plunger iteself is reciprocated as a motor driven screw threadedly engages a non-rotating unit affixed to the plunger. Another and much smaller group of actuators comprise motor rotated nuts turning within an internally threaded non-rotating reciprocating thimble or vice versa. In this smaller group to which the invention generally appertains, are found the U.S. Pats., No. 2,893,130 of Ierokomos for a Micrometer Depth Gauge and U.S. Pat. No. 2,659,241 of Holman for a Screw and Nut Mechanism. However, these two patents do not include a motive power source and among the others known in the art, apparently little or no attention has been given to rendering a compact design for such actuators especially when coupled to a motor. In fact, in each of the known devices of the type described, the motive power source has either been positioned alongside the actuator or in line and external to it.

SUMMARY OF THE INVENTION

It is accordingly a principal object of the invention to provide a new and improved motor powered linear actuator that is more compact than prior art actuators of a comparable power capacity and length of powered thrust.

It is another object of the invention to provide a new and improved motor powered linear actuator that is lower in cost than prior art actuators of the same class.

It is yet another object of the invention to provide a new and improved motor powered linear actuator having adjustable mechanical stops for either extreme of reciprocation of its plunger.

It is still another object of the invention to provide a new and improved motor powered linear actuator especially suitable for use as an artificial muscle in a prosthesis such as an artificial limb for the human body.

Yet another object of the invention is to provide a new and improved motor powered linear actuator especially useful for effecting reciprocation of mechanical loads such as aircraft flaps and screw jacks.

In keeping with these objects, the inventive linear actuator comprises a motor driven worm gear. Both the worm gear and the motor are arranged within a hollow tubular-like plunger having an internal worm cut into its interior surface and engaged with the worm gear. Means are provided for longitudinal guidance of the plunger during its reciprocating travels. For a better understanding of the invention and its advantages, reference should be made to the accompanying drawings and descriptive matter in which are illustrated and described specific invention embodiments.

DESCRIPTION OF THE DRAWINGS

FIG. 1 is a perspective view of the linear actuator of the invention;

FIG. 2 is a cross sectional view of the actuator of FIG. 1 taken along 2—2 of FIG. 1;

FIG. 3 is an exterior view of an alternative construction of the embodiment of FIGS. 1 and 2;

FIG. 4 is an exterior view of an alternative construction to that of FIG. 3;

FIG. 5 is a perspective view of a simplified version of the inventive linear actuator;

FIG. 6 is a cross sectional view of the actuator of FIG. 5 taken along 6—6 thereof;

FIG. 7 is a motor end view of the linear actuator of FIGS. 5 and 6 illustrating an alternative construction thereof;

FIG. 8 is a partial perspective view of the motor portion of the actuator of FIG. 7;

FIG. 9 is a partial perspective view of the plunger of the actuator of FIG. 7;

FIG. 10 is a side view of the plunger guide illustrated in FIGS. 7 and 8; and

FIG. 11 is a perspective view of a stop usefully employed in the embodiments of FIGS. 7–9

DESCRIPTION OF THE PREFERRED EMBODIMENTS

Referring now in detail to the drawing and more particularly to FIGS. 1 and 2 thereof, there is shown the linear actuator of the invention. A reversible electric motor 38 provides the motive power for the actuator. While alternative motor types can be used, because of their small size and simplicity the motor 38 is preferably of the D.C. permanent magnet type. Such motors are compact and readily controlled as to both speed and direction. While the detailed construction of motor 38 is not within the scope of the invention, for reasons which will become obvious, the exterior shell 40 of the motor is cylindrical and smooth. Further, while internal details of the motor are not shown, depending upon the thrust requirements of the actuator and the available motor torque and speed, a gear reduction unit has been incorporated within the motor shell 40 where the torque multiplication thereby provided is necessary or desirable. One type of gear reduction unit is the planetary type disclosed in U.S. Pat. No. 3,190,414 of Maurer et al.

Motor 38 is axially disposed within a generally tubular housing member 12, having a closed end 14 and is secured by any suitable fastening means to the end 14. In use, housing 12 provides the mounting for the actuator and to that end is adapted as necessary to provide any one of synchro, foot, or flange mounting provisions, although none of these mounting provisions are particularly shown or preferred. The power and control electrical leads 16 for motor 38 extend through the closed end 14 to enable connection to any suitable source of electrical power and control.

Secured to the output shaft 18 of motor 38 is a worm gear 20. The teeth of worm gear 20 engage the corresponding teeth of an internal worm formed on the interior of a tubular plunger 22. Plunger 22 has its one end closed by an output adaptor 24 secured thereto and here shown as bearing a simple shaft coupling 26. Plunger 22 is guided in its reciprocating motion by ball bearings 32 secured to housing 12 and by ball bearings 34 and 36 secured to the plunger itself and by pin keys 23 engaging keyway slots 25 to prevent rotation of the plunger relative to housing member 12. Manifestly, the keyways could be disposed on the interior surface of the housing and the keys affixed to the plunger and the effect would be the equivalent.

As can be appreciated, whenever motor 38 is actuated, worm gear 20 rotates in one direction or another as shown by double arrow 28, depending upon motor connections to the external power source. Rotation of the worm gear 20 effects the linear translation of plunger 22 in either direction of double arrow 30 and corresponding to the direction of rotation of worm gear 20.

Because of the use of a worm gearing arrangement, the system can be made non-reversible thus eliminating the need for a separate brake to prevent the load from driving the actuator. In one favored embodiment of the actuator having a 300 pound load, non-reversible operation was satisfactorily achieved with a worm having a pitch of 8. Depending on the materials and loads encountered, non-reversible operation was satisfactorily achieved with worm pitches between 6 and 10.

Another advantageous feature of the embodiment of FIG. 1 is illustrated in the FIG. 2 cross section. As can be appreciated from an examination of FIG. 2, the worm gear 20 can disengage the internal worm formed on the interior of the plunger at either extremity of plunger travel. This possibility is purposely present to prevent accidental damage to the actuator such as might otherwise occur. When the plunger is fully extended (moved away from worm gear 20), compression spring 35 is compressed between the plunger and the housing. Then, when motor operation ceases, spring 35 drives the plunger 22 inwardly (retraction) until the worm gear and worm are engaged. Similarly, when the plunger is fully retracted, compression spring 37 insures continued engagement of the gears.

FIGS. 3 and 4 show the manner in which battery and/or control circuit compartments can be affixed to the actuator embodiment of FIGS. 1 and 2. In FIG. 3, the compartment 42 is shown as an extension of housing 12 and has extending therefrom control and/or power leads 44. In the construction of FIG. 4, the compartment 46 is mounted "piggy-back" style on the side of housing 12. Control and/or power leads 48 extend from housing 46. Manifestly, when the power source is a battery, it can be mounted in the compartment 42 in juxtaposition to the motor as in FIGS. 3 and 4. Then leads 44 and 48 can be dispensed with entirely and a simple electro-mechanical controller such as a switch or switch and variable resistor substituted therefor.

A feature of the inventive actuator is its compactness and an especially compact series of embodiments are shown in FIGS. 5–11. Essentially, these embodiments are simpler versions of the embodiment of FIGS. 1 and 2. However, the exterior housing of the previously described embodiments is dispensed with and the plunger is instead guided in its by keys bykeys and keyways either cut into or upstanding from the motor's exterior shell and the plunger. This arrangement has proven feasible for application where dirt and dust are low and where side thrust on the plunger is limited or unlikely. under these conditions, the actuators of FIGS 5–11 are preferred for their still further decreased bulk and reduced cost.

In FIG. 5, reversible electric motor 50 connected to and controlled by an external power source (not shown) by leads 52 provides the driving force for the actuator. Keyways 54 are cut into the exterior shell 56 of the motor and engage corresponding keys 58 upstanding from the interior surface of plunger 60. As motor shaft 62 and worm gear 64 are rotated in the direction of arrow 66 by motor 50, they effect reciprocation of the plunger 60 by virtue of the engagement of worm gear 64 with the internal worm 68. This reciprocation in the direction of arrow 70 results in corresponding motion of output adapter 72.

Various essential portions of another embodiment especially adapted for low cost manufacture are shown in FIGS. 7–11. In FIG. 7 an end view of this embodiment is shown. Internal worm and worm gear drive, achieved in the same manner as in the previously described embodiments, effects selective reciprocation of the plunger. Motor 74 is generally disposed coaxially with and interior of plunger 76. Upstanding from motor 74 are fabricated upstanding keys 78. These keys are shown in enlarged detail in FIGS. 8 and 10. As there shown, the keys 78 are approximately "T" shaped and are fastened to motor 74 by any suitable fasteners 80. In practice these keys 78 have been constructed from oil impregnated sintered bronze and from a brass extrusion, the latter being the least expensive. The keys extend into keyways 83 cut into plunger 76 to effect its guidance and support during reciprocation.

FIGS. 8–11 illustrate two methods of incorporating a stop into the embodiment of FIG. 7. In FIG. 8, a pin 82 is selectively inserted into key 78 at a particular position along its length. Similarly, one or more screws or pins 84 are inserted in the keyway 83 of plunger 76. As can be readily visualized, pin 82 striking the end of plunger 76 will stop reciprocation of the plunger in one direction while pin 84 striking the upturned ear 86 of key 78 will stop motion in the opposite direction. Whenever stops are utilized, it has been found preferable to utilize a friction slip-clutch in the motor or in conjunction with the worm wheel. Then, when a stop engages, the clutch slips and the possibility of damage to the motor is greatly reduced.

Another and adjustable stop arrangement is shown in FIGS. 9–11. There a pair of "L" shaped stops 88 are assembled into the keyway straddling the ear 86 of the key. By adjusting the distance $l$ to equal total desired travel and then securing the stops in place by a screw passed through their adjustment slots 90, total travel can be readily and inexpensively limited. As will be apparent, the screw for adjusting stop length can terminate exterior of plunger 76 and advantageously could be screw 84.

When only certain embodiments of the invention have been shown and described, it is apparent that modifications, changes, and alterations including changes in the type of motirve power, may be made without departing from the true scope and spirit thereof. Among the more obvious of the modifications is the substitution of A.C. electric, pneumatic or hydraulic motive power sources in place of the D.C. source the foregoing description embodies. However, in all cases the preferred construction of the invention results in a nested group of elements that is more compact than the actuators of the prior art. Therefore, it should be understood that for a definition of the limitations of the invention, reference must be had to the appended claims.

I claim:

1. A powered linear actuator compirising
   tubular housing means substantially closed at one end and open at the other end, a motive power source having a rotatable output shaft, said motive power source being disposed within said tubular housing and affixed to said closed end to prevent rotation therebetween, a worm gear affixed to said rotatable output shaft, and tubular plunger means disposed coaxially of and over said worm gear and said motive power source and interior and coaxially of said housing means, said plunger means having an internal worm on its inner surface in engagement with said worm gear, whereby rotation of said motor output shaft and said worm gear effects reciprocal displacement of said plunger means, to thereby extend or retract said plunger, said plunger means at least partially covering said motive power source when retracted.

2. A linear actuator in accord with claim 1 further comprising one or more keyway slots on the exterior surface of said plunger means and parallel to the axis thereof, key means affixed to said housing means and engaging said keyway to thereby prevent relative rotation between said plunger means and said housing means.

3. A linear actuator in accord with claim 1 further comprising one or more keyway slots on the interior surface of said housing means and parallel to the axis thereof, key means affixed to said plunger means and engaging said keyway slots to thereby prevent relative rotation between said plunger means and said housing means.

4. A linear actuator in accord with claim 1 further comprising comparment means affixed to said housing means, and compartment means including a stored energy source.

5. A powered linear actuator comprising
tubular housing means substantially closed at one end,
a motive power source having a rotatable output shaft said motive power source being disposed within said tubular housing and affixed to said closed end to prevent rotation therebetween
a worm gear affixed to said rotatable output shaft,
tubular plunger means disposed coaxially of said worm gear, said motive power source and said housing means and intermediate said motive power source and said housing means, said plunger means having an internal worm on its inner surface in engagement with said worm gear, whereby rotation of said motor output shaft and said worm gear effects reciprocal displacement of said plunger means, to thereby extend or retract said plunger, and
compartment means affixed to said housing means, said compartment means including a stored energy source and actuator control means adapted to control the extension and retraction of said plunger means.

6. A powered linear actuator comprising
tubular housing means substantially closed at one end,
a motive power source having a rotatable output shaft, said motive power source being disposed within said tubular housing and affixed to said closed end to prevent rotation therebetween,
a worm gear affixed to said rotatable output shaft, tubular plunger means disposed coaxially of said housing means and intermediate said motive power source and said housing means, said plunger means having an internal worm on its inner surface in engagement with said worm gear, whereby rotation of said motor output shaft and said worm gear effects reciprocal displacement of said plunger means, to thereby extend or retract said plunger, and spring means disposed about said motor means and interior of said housing means to effect a minimum extension of said plunger means and thereby maintain engagement between said worm gear and said worm when said plunger is substantially fully retracted.

7. A powered linear actuator comprising
tubular housing means substantially closed at one end,
a motive power source having a rotatable output shaft, said motive power source being disposed within said tubular housing and affixed to said closed end to prevent rotation therebetween,
a worm gear affixed to said rotatable output shaft,
tubular plunger means disposed coaxially of said worm gear, said motive power source and said housing means and intermediate said motive power source and said housing means, said plunger means having an internal worm on its inner surface in engagement with said worm gear, whereby rotation of said motor output shaft and said worm gear effects reciprocal displacement of said plunger means, to thereby extend or retract said plunger, said plunger means having one or more keyway slots on its exterior surface and parallel to the axis thereof
key means affixed to said housing means and engaging said keyway to thereby prevent relative rotation between said plunger means and said housing means, and
spring means disposed about said plunger means and interior of said housing means to effect a minimum retraction of said plunger and thereby maintain engagement between said worm gear and said worm when said plunger is substantially fully extended.

8. A powered linear actuator comprising
motive power source means having a rotatable output shaft,
a worm gear affixed to said output shaft for rotation therewith, and
tubular plunger means disposed coaxially of and over said motive power source means and said worm gear, said plunger means having an internal worm on its inner surface in engagement with said worm gear whereby rotation of said motor output shaft and said worm gear effects reciprocal displacement of said plunger means and its extension or retraction, said plunger means at least partially covering said motive power source when retracted.

9. A powered linear actuator in accord with claim 8 further comprising compartment means affixed to said motive power source means, said compartment means including a source of stored energy.

10. A powered linear actuator in accord with claim 9 wherein said compartment means further comprises actuator control means adapted to control the extension and retraction of said plunger means.

11. A linear actuator in accord with claim 8 further comprising one or more keyway slots on the exterior surface of said motive power means and parallel to the axis thereof, key means affixed to said plunger means and engaging said keyway slots to thereby prevent relative motion between said motive power source means and said plunger means.

12. A linear actuator in accord with claim 6 further comprising one ore more keyway slots on the interior surface of said plunger means and parallel to the axis thereof, key means upstanding from the exterior surface of said motive power means and engaging said keyway slots to thereby prevent relative motion between said motive power source means and said plunger means.

13. A powered linear actuator comprising
motive power source means having a rotatable output shaft,
a worm gear affixed to said output shaft for rotation therewith,
plunger means disposed coaxially of said motiive power source means and said worm gear, said plunger means having an internal worm on its inner surface in engagement with said worm gear whereby rotation of said motor output shaft and said worm gear effects reciprocal displacement of said plunger means and its extension or retraction,
one or more keyway slots on the interior surface of said plunger means and parallel to the axis thereof, and
key means upstanding from the exterior surface of said motive power means and engaging said keyway slots to thereby prevent relative motion between said motive power source means and said plunger means, said upstanding key means comprising a "T" shaped cross section extending parallel to the axis of said motive power source.

14. A linear actuator in accord with claim 13 wherein said upstanding key means further comprises an upstanding ear disposed at the end of said key interior of said plunger, and stop pin means secured to said plunger and extending into said keyway slot whereby engagement of said stop pin means and said upstanding ear limit retraction of said plunger means.

15. A linear actuator in accord with claim 13 further comprising one or more "L" shaped stops secured to said plunger means and interior of said keyway slots, said stops being adapted to engage said key means and thereby limit extension of retraction of said plunger means.

* * * * *